United States Patent
Botnan

(10) Patent No.: US 6,601,454 B1
(45) Date of Patent: Aug. 5, 2003

(54) APPARATUS FOR TESTING JACK LEGS AND AIR DRILLS

(76) Inventor: Ted R. Botnan, 624 B St., Rock Springs, WY (US) 82901

(*) Notice: Subject to any disclaimer, the term of this patent is extended or adjusted under 35 U.S.C. 154(b) by 0 days.

(21) Appl. No.: 10/261,045

(22) Filed: Sep. 30, 2002

Related U.S. Application Data

(60) Provisional application No. 60/326,280, filed on Oct. 2, 2001.

(51) Int. Cl.[7] .............................. G01L 7/00; G01M 3/08
(52) U.S. Cl. ........................................... 73/756; 73/49.1
(58) Field of Search ............................ 73/38, 714, 39, 73/40, 40.5 R, 40.7, 45.5, 45.6, 46, 49, 49.1, 49.5, 49.6, 356, 729.1, 729.2, 146.8, 730, 731, 756; 219/121.39, 121.44, 121.55, 121.59, 121.56, 75; 137/174; 175/209; 173/221

(56) References Cited

U.S. PATENT DOCUMENTS

| | | | | |
|---|---|---|---|---|
| 3,695,367 A | * | 10/1972 | Catterfeld et al. | 173/221 |
| 3,793,835 A | * | 2/1974 | Larralde | 60/413 |
| 3,888,274 A | * | 6/1975 | Weston | 137/174 |
| 4,128,014 A | * | 12/1978 | Enatsu | 73/729.1 |
| 4,462,248 A | * | 7/1984 | Cronshaw | 73/38 |
| 4,924,697 A | * | 5/1990 | Hunt et al. | 73/146.8 |
| 5,055,043 A | * | 10/1991 | Weiss et al. | 433/86 |
| 5,591,357 A | * | 1/1997 | Couch et al. | 219/121.39 |
| 5,647,444 A | * | 7/1997 | Williams | 175/209 |
| 5,695,662 A | * | 12/1997 | Couch et al. | 219/121.39 |

* cited by examiner

Primary Examiner—William Oen

(57) ABSTRACT

An apparatus for testing for air and water leakage in jack legs and air drills used to bore holes in rock and ore has an upright beam supporting a weight vertically movable with expansion of the jack leg. A test stand has a plurality of valves operable to divert air to the jack leg and air drill. Gauges on the test stand monitor the air pressure in the jack leg and air and water pressures in the air drill to provide information as to air and water leakage and defective parts in the jack leg and air drill.

20 Claims, 7 Drawing Sheets

APPARATUS FOR TESTING JACK LEGS AND AIR DRILLS

CROSS REFERENCE TO RELATED APPLICATION

This application claims the priority benefit of U.S. Provisional Patent Application Ser. No. 60/362,280 filed Oct. 2, 2001.

FIELD OF THE INVENTION

The invention relates to methods and apparatus for testing fluid operated tools. The apparatus is directed to the testing of pneumatic jack legs and air operated drills used in underground mining of ore.

BACKGROUND OF THE INVENTION

Air drills are used in underground mining to drill horizontal, slant or vertical holes in the rock or ore. Air drills were developed in 1930–35 for underground coal, silver, diamond, gold and metal mining. These air drills are made by only four (4) companies, which are: TOYO (Japan), Secan (Canada made in South Africa), IR, and Midwest (United States).

In use, the air drills are mounted on a jack leg which is an expandable piston and cylinder assembly. The air drill is mounted on one end of the jack leg. The other end of the jack leg has a crows foot adapted to be anchored on a support such as a floor or wall of the mine shaft. The operator of the air drill uses the jack leg to force a tubular drill into the rock or ore. The operator also regulates the speed of rotation of the drill.

The air drill and jack leg have a number of seals and tubes which over time can fail. When the seals leak air, the air drill and jack leg cannot be used and must be repaired. The conventional practice is to take the air drill and jack leg apart and replace the parts or rebuild this equipment. A mechanic in the mine shop can rebuild about seven jack legs in a 12 hour mining shift. The following U.S. Patents are related to methods and apparatus for testing air drills.

R. A. Chambers in U.S. Pat. No. 842,136 discloses a method and apparatus for testing pneumatic tools, such as rock drills. The pneumatic drill is connected to a piston of a testing cylinder. The piston is moved against a body of water to compress a column of air. The amount of air compressed is measured against the air consumed in operating the test machine. The air pressures, volume, and temperature data is used to calculate the efficiency of the drill.

L. Pryce in U.S. Pat. No. 1,576,465 discloses a method and apparatus for testing a hammer rock drill having a piston and tool chuck. A standard drill is used and operated to provide an index of the working capacity of the drill. The test drill is operated under the same conditions as the standard drill. A comparison of the rotational speeds of the tool chuck provides data as to efficiency of the test drill.

H. H. HAMAN in U.S. Pat. No. 2,909,922 discloses a portable testing device for rock drills for checking on repair work and determining when repairs are required. A brake is rotated by the test drill. The force applied to the brake is registered on a gauge which indicates the braking force. The pressure reading of the gauge is compared with a standard operating drill to determine the performance of the test drill.

Edwin J. Deremo et al in U.S. Pat. No. 4,901,587 describes a drill fixture for comparing the performance of a test drill with a simulated load. The linear drill travel and drill RPM are compared with standard data to determine operational effectiveness of the drill.

Gerard T. Pittard et al in U.S. Pat. No. 5,277,055 discloses a test stand for providing information as to impact energy and rotary speed of a drilling tool. This information is compared with a database in a computer as to the past history of the tool and the manufacturer's recommended operating specifications to provide information regarding the operational efficiency of the test drill.

SUMMARY OF THE INVENTION

The apparatus of the invention is used to test the air drill and jack leg to determine the location of the defective seal or part. The defective seal or part is replaced without taking the entire air drill or jack leg apart. The mine mechanic can repair about 60 jack legs in a 12 hour mining shift. The test apparatus of the invention saves considerable time, labor and cost. The number of parts for repair of this equipment is reduced as only the broken or defective parts are fixed.

The test apparatus has an upright beam movably supporting a weight which provides a reaction force for an expandable jack leg. The jack leg has an upright cylinder accommodating one or more pistons and seals. A test stand having air pressure gauges and valves is connected with air lines to the jack leg. Air pressure is selectively applied to the jack leg located under the weight to test the effectiveness of the seals in the jack leg. Defect seals are replaced to place the jack leg in operative condition. The test stand also has air pressure gauges and a water pressure gauge and valves connected with air lines to the air drill to locate air and water leakage in the air drill and controls for the air drill. The test apparatus provides information then isolates the defective parts of the air drill and its controls. This allows the repair of the air drill with only replacement of the defective parts. There is a substantial saving of labor time and cost of repairing jack legs and air drills by identifying the defective parts of the jack legs and air drills and only replacing these parts.

DESCRIPTION OF PREFERRED EMBODIMENTS OF INVENTION

Figure 1:
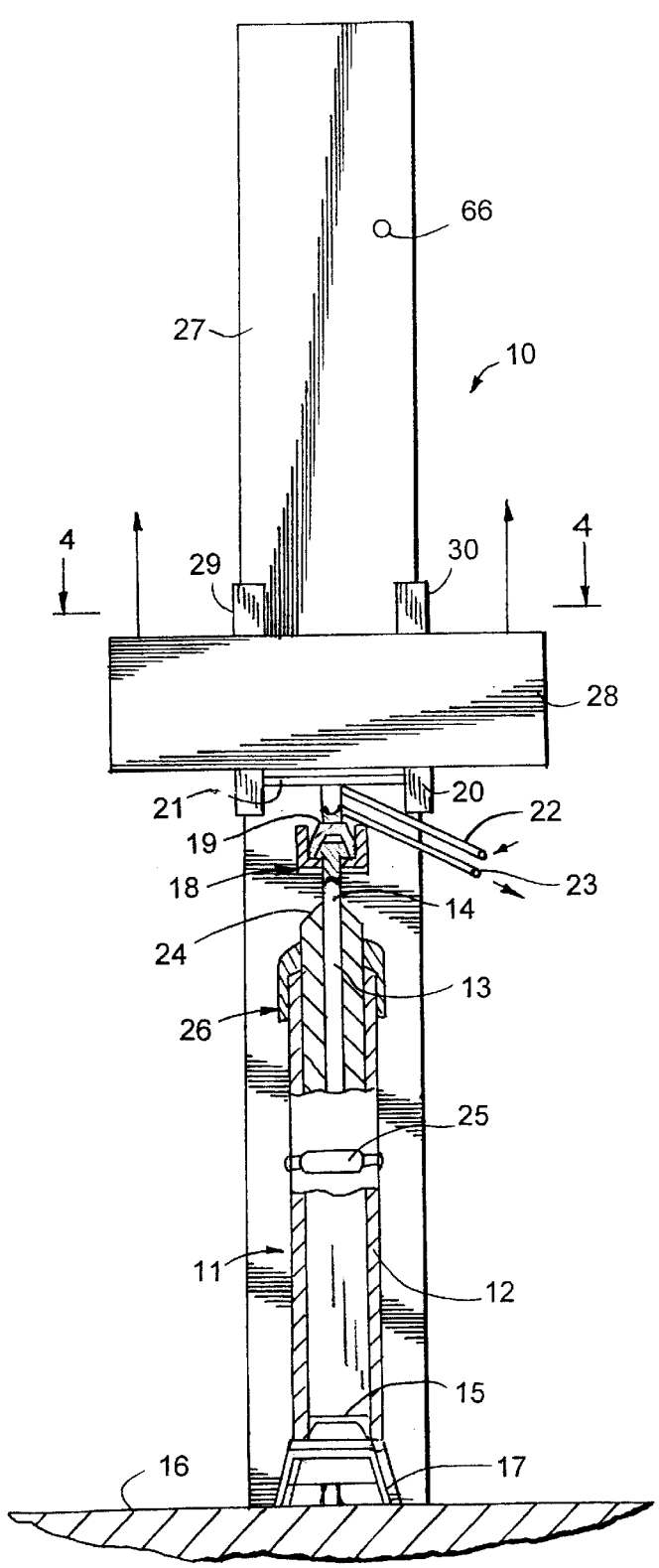
FIG. 1 is a front elevational view, partly sectioned, of the jack leg tester of the invention.
Figure 2:
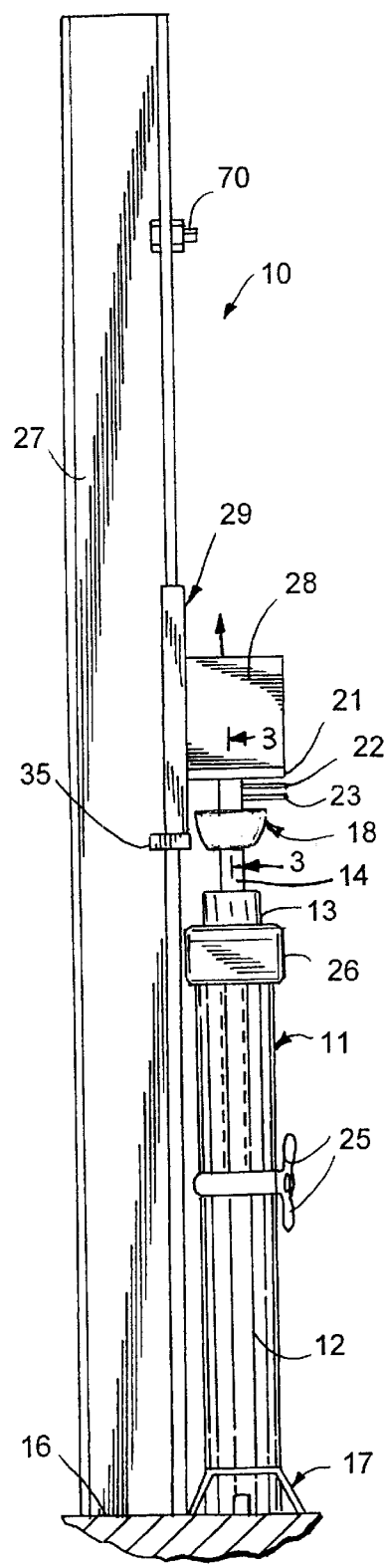
FIG. 2 is a side elevational view of FIG. 1.
Figure 3:
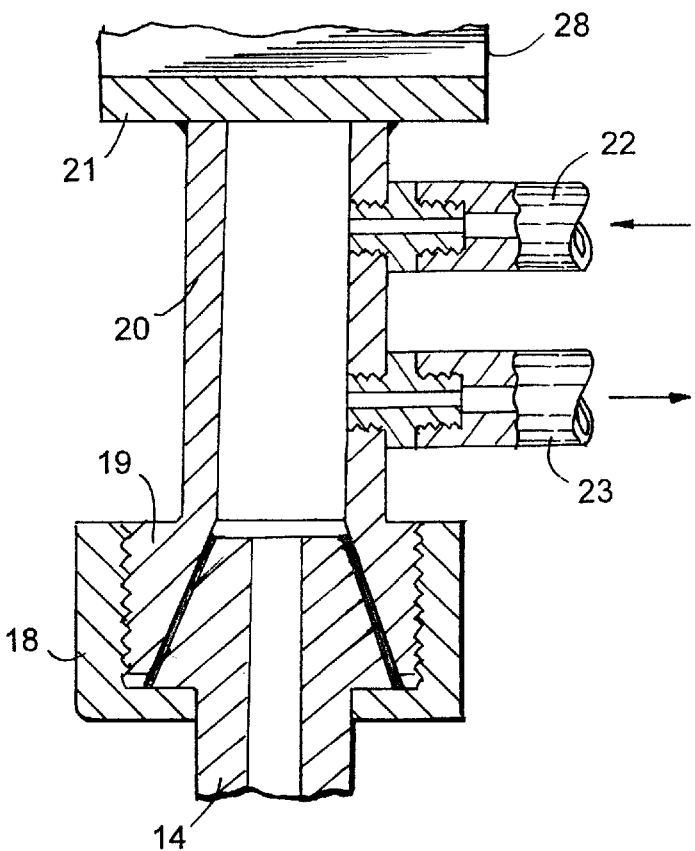
FIG. 3 is an enlarged sectional view taken along line 3—3 of FIG. 2.

The jack leg tester, indicated generally at 10 in FIGS. 1 and 2, is used to test air pressure within jack leg 11. Jack leg 11 is a piston and cylinder assembly that linearly expands and contracts in response to air pressure. Jack leg 11 has an outer tubular member or cylinder 12 accommodating one or more pistons 13. A handle 25 mounted on the middle of cylinder 12 is used by miners to transport and position jack leg 11 in the mine. A hollow rod or piston 14 is a linear tubular member that extends upwardly from piston 13. Rod 14 is open to the bottom of piston 13 to allow air to flow into the internal chamber of cylinder 12. The upper end of rod 14 has a cone-shaped head. A seal 15 is located at the bottom piston 13. Jack leg 11 is supported in an upright position on a support or floor 16 with a foot 17, known as a crows foot. A nut 18 on the upper end of rod 14 joins rod 14 to an adapter 19. Adapter 19 has a short upright tube 20 secured to a horizontal plate 21. As seen in FIG. 3, the lower end of tube 20 is mounted on the cone-shaped head of tube 14. Adapter 19 has an internal cone-shaped wall that engages the cone-shaped head of tube 14. Nut 18 threaded on adapter 19 holds the adapter 19 in sealing engagement with the cone-shaped head of tube 14. Plate 21 engages the bottom of weight 28. Air lines or hoses 22 and 23 carry air under pressure to and from tube 20 and jack leg 11. A wiper seal 24 and cap 26 on the upper end of cylinder 12 protects the outer surface of piston 13.

Figure 4:
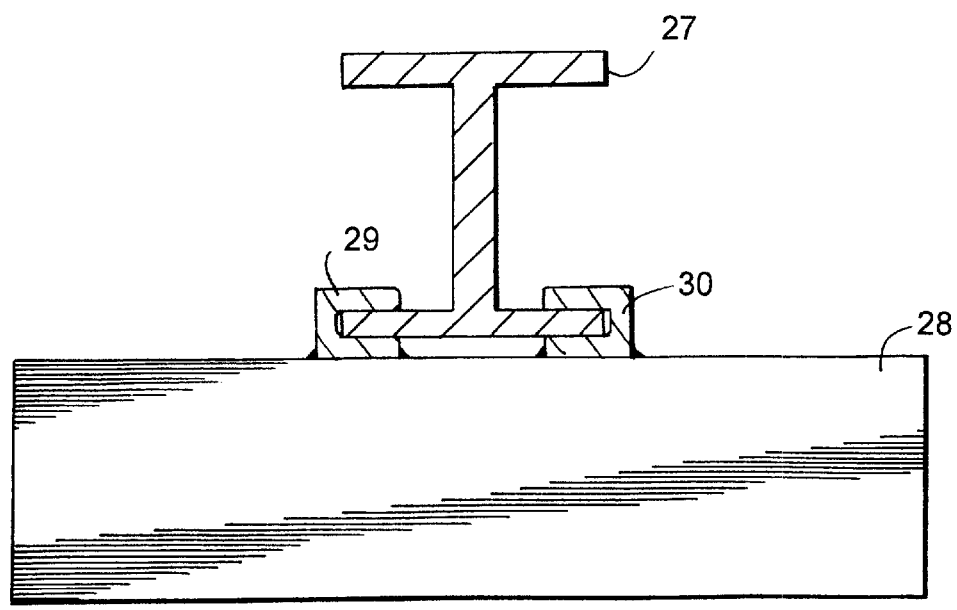
FIG. 4 is an enlarged sectional view taken along line 4—4 of FIG. 1.

Jack leg tester 10 has an upright beam 27 anchored on floor 16. Beam 27 is a rigid metal guide having upright side flanges and an I or H beam shape. A weight 28 is slidably mounted on beam 27 for movement between up and down positions. Guide members 29 and 30 on opposite sides of weight 28 engage opposite side flanges of beam 27 to limit movement of weight 28 linearly along beam 27. As shown in FIG. 4, members 29 and 30 are U-shaped or channel members slidably mounted on the linear upright edges of beam 27. Other mounting devices including rollers can be used to movably mount weight 28 on beam 27 and allow weight 28 to ride up and down along the length of beam 27. Fasteners, such as bolts or welds, secure weight 28 to members 29 and 30. Weight 28 is a 400 pound box-shaped body of metal or concrete. Other material and weights sizes and amounts can be used in tester 10. A stop 35 attached to beam 27 engages member 29 to limit downward movement of weight 28.

Figure 5:
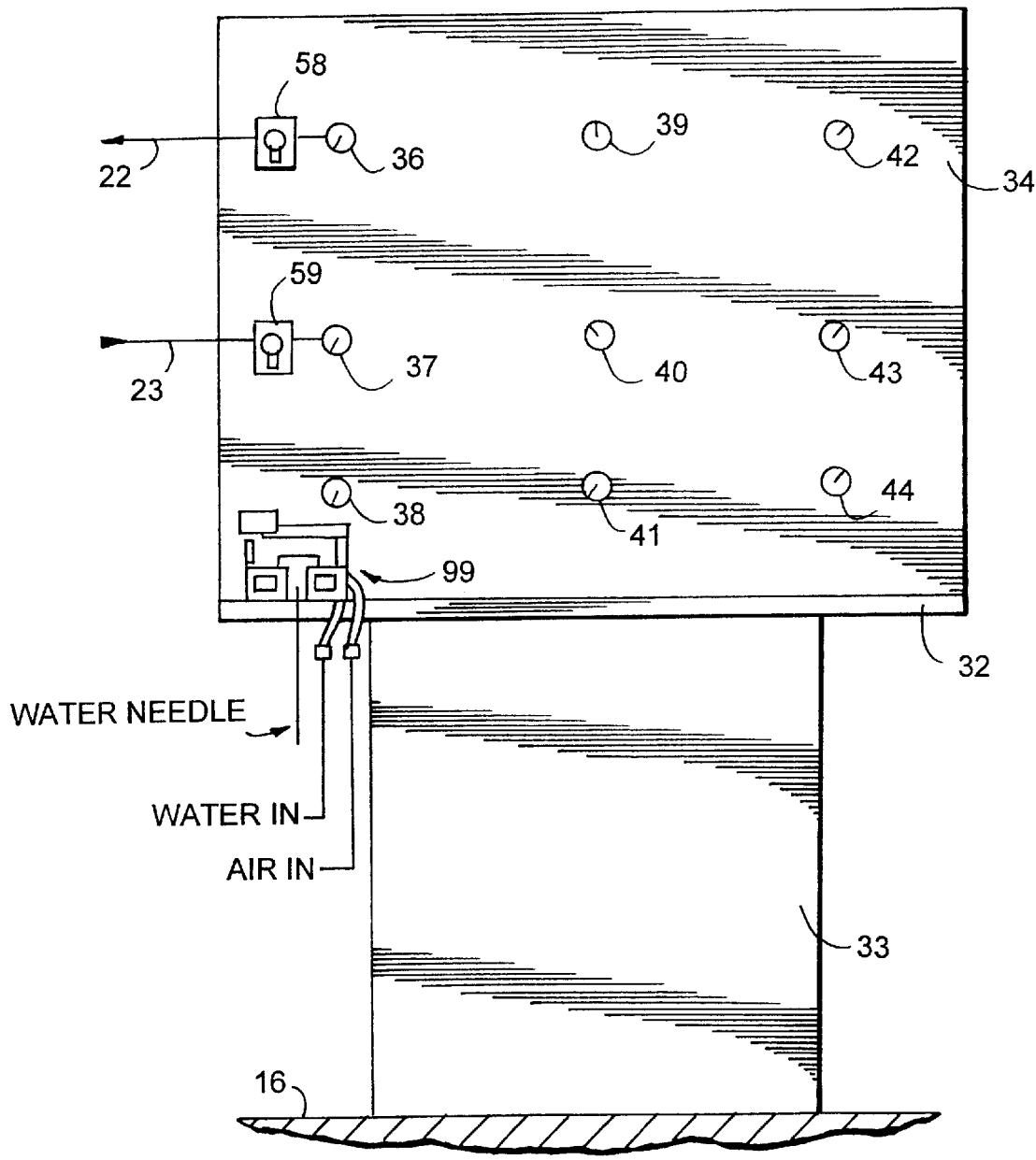
FIG. 5 is a front elevational view of the test bench connected with air lines for the jack leg.
Figure 6:
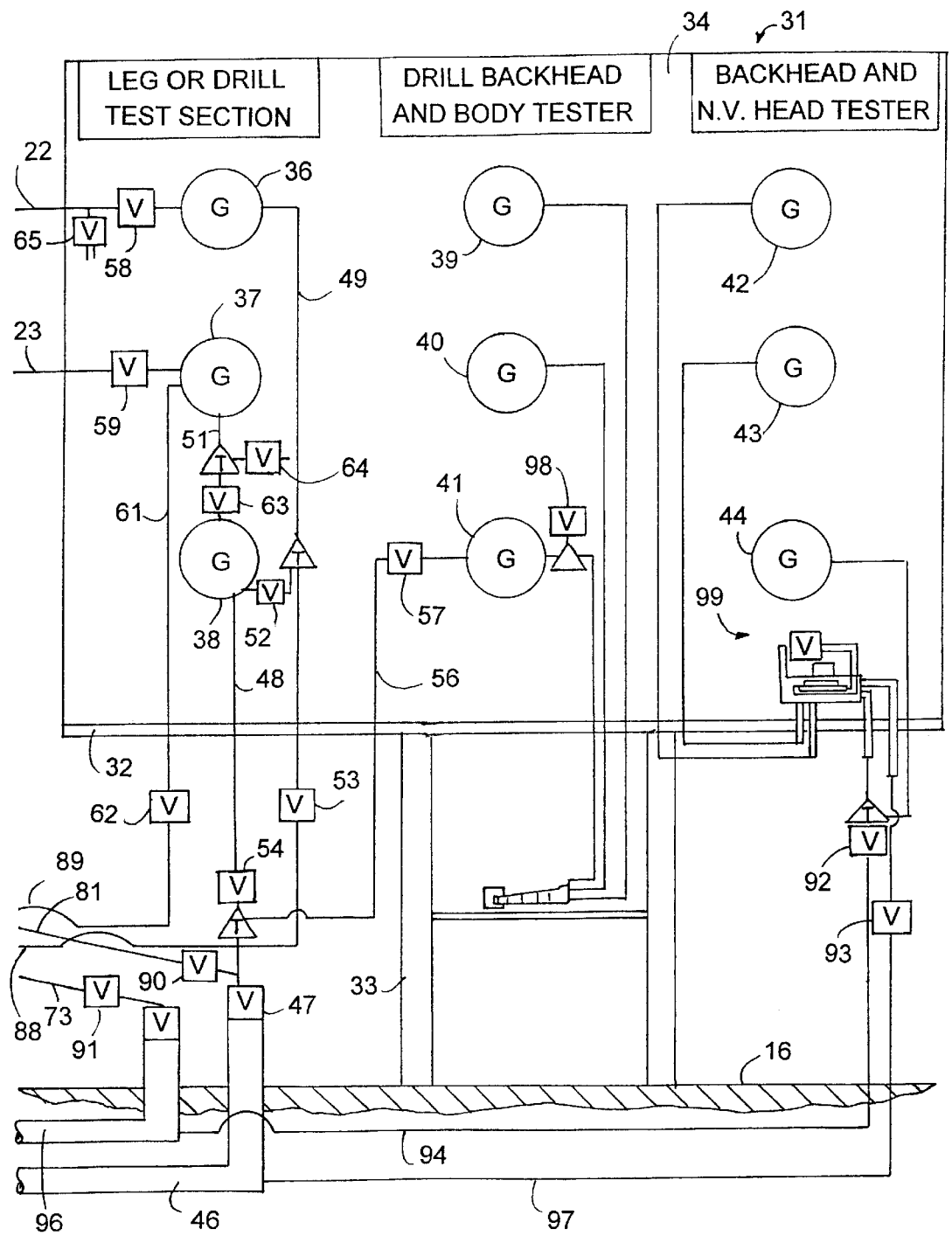
FIG. 6 is a diagrammatic view of the test bench gauges and air and water valves.

As shown in FIGS. 5 and 6, a test bench 31 has a horizontal table 32 mounted on upright supports or posts 33. An upright back wall or panel 34 is secured to and extended upwardly from table 32. A plurality of air pressure gauges 36–43 and a water pressure gauge 44 mounted on panel 34 are used to monitor the air pressure in jack leg 11, the air and water pressure in an air drill, as hereinafter described.

In use, as shown in FIGS. 1 and 2, jack leg 11 is located in an upright position next to beam 27 and attached to adapter 19 with nut 18. Crows foot 17 rests on floor 16. Plate 21 of adapter 19 engages the bottom of weight 28. Air lines 22 and 23 are coupled to a pair of gauges 36 and 37, a source of air pressure and control valves 58 and 59 operable to control the flow of air into and out of adapter 19 and jack leg 11. Air lines 22 and 23 are also connected to adapter 19. The test bench 31 has valves 58 and 59 and gauges 36 and 37 that check the pressure of the air in the various chambers of the jack leg. The test air pressure is supplied to adapter 19 to expand the jack leg 11 to raise the weight 26. If one or more seals in jack leg 11 are defective or a part is broken, the jack leg will not expand. The air pressure gauges 36 and 37 on the test bench are used to determine the location of the defective seal or part.

As shown in FIG. 6, mine air supply line 46 connected to a main valve 47 supplies air under pressure to test stand 31. The air supply has a capacity of 1200 CFM and a pressure of 120 PSI. Other air pressures can be used to test the jack leg 11 and air drill. Gauge 38 connected with air line 48 to valve 38 which provides readable data as to the supply air pressure. Gauge 38 is connected with air lines 48 and 51 to feed gauge 36 and retract gauge 37. An on-off valve 52 is in the air line connecting gauge 38 to air line 49. Air line 49 has an on-off valve 53. Line 48 includes an on-off valve 54 which when closed directs air to an air line 56 leading to a second air pressure gauge 41. Line 56 has an on-off valve 57 operable to shut off the flow of air to gauge 41. The on-off valve 58 in line 22 controls the flow of air from gauge 36 to adapter 11. Another on-off valve 59 in line 23 controls the flow of air from adapter 11 to gauge 37. A second air outlet line 61 connects to gauge 37 leading to the air drill. Line 61 has an on-off valve 62 operable to shut off the flow of air to the air drill.

In use, jack leg 11 is tested for air leakage according to the following procedure:

1. Jack leg 11 is placed under weight 26 with crows foot 17 on floor 16. Nut 18 is threaded on adapter 19 with plate 21 under weight 28.

2. Main valve 47 is turned on. Valves 52, 53, 54, 58 and 59 are open. Valves 57, 63, 64, and 65 are closed. Pressure gauges 14 and 15 show the air pressure subjected to jack leg 11.

3. Jack leg 11 under the influence of air pressure will expand to move weight 28 to top of beam 27.

4. Valve 52 is turned off to terminate air flow to feed gauge 36. The air pressure in line 22 is monitored by gauge 36. Jack leg 11 has air leakage when gauge 36 shows a drop in air pressure in line 22.

5. Bleed valve 65 is opened to allow jack leg 11 to retract about 2 feet and then closed to check for additional air leaks. The sequential retraction of jack leg 11 is repeated to check for further air leaks.

6. If jack leg 11 does not pass these tests, it is removed from under the weight. Defective parts and seals of jack leg 11 are replaced to place jack leg 11 in operational condition.

The test of the retract function of jack leg 11 is as follows:

1. Expand jack leg 11 to move weight 28 to top of beam 27 with air pressure from main line 46.

2. A bolt 70 is placed in hole 66 in beam 27 to provide a stop for weight 28. Weight 28 is lowered by bleeding air via valve 65 until weight engages bottom bolt 35.

3. With valve 65 open, close valve 64 and open valves 59 to 63 to supply jack leg 11 with air pressure.

4. The first stage of jack leg 11 should pick up the jack leg and lift it at about 70 PSI before the weight 28 is moved to the top of beam 27.

5. The retract air pressure is then allowed to build up to mine air pressure, about 120 PSI, and then lower jack leg 11 about one foot at a time by closing valve 63 and bleeding the air via valve 64.

6. If there are any problems, the jack leg 11 is removed from weight 28. Repairs are made on the parts that are defective.

Figure 7:
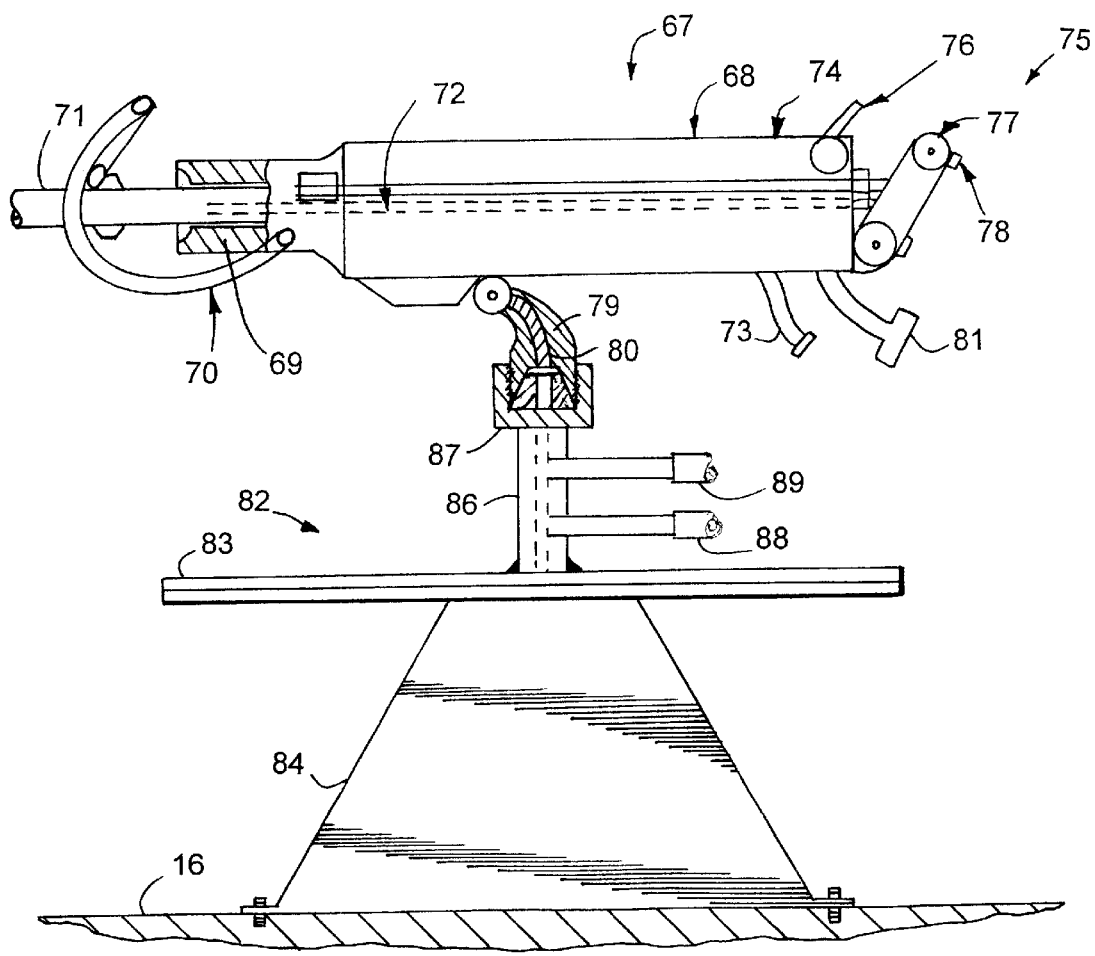
FIG. 7 is a side elevational view of an air drill mounted on a test stand.
Figure 9:
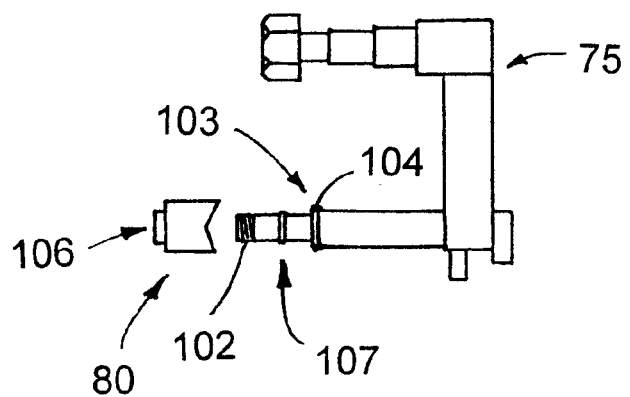
FIG. 9 is an exploded side elevational view of the D handle of FIG. 8.

As shown in FIG. 7, air driver drill 67 is a conventional mining drill having a body 68 attached to a front head equipped with a chuck 69. An elongated tubular steel drill 71 extends forwardly from chuck 69 and a chuck tender 70. A water tube or needle 72 coupled to a water inlet hose 73 carries water to drill 71 to cool drill 71 as it is turned into rock or ore. The water also lubricates the cutting teeth of the drill. Drill 71 has a longitudinal passage to carry water to the cutting end of the drill. A backhead 74 equipped with a D handle 75, a throttle 76 and jack leg control 77 is attached to the rear of body 68. As shown in FIG. 9, "D" handle 75 has a cylindrical control 80, known as a corncob, that controls the flow of air to jack leg 11. Control 77 has a retract button 78, shown in FIG. 7. An air inlet hose 81 directs air under pressure to throttle 76 which is used by the operator to regulate the operation of drill 71. Body 58 is supported on a leg swivel 79 connected to a drill stand 82. Leg swivel 79 has a cone-shaped inside wall and a passage for air flow to body 68.

Drill stand 82 has a flat table 83 mounted on a leg support 84. An upright adapter 86 mounted on table 83 has a cone-shaped head and a nut 87 for coupling leg swivel 79 to adapter 86. Cone-shaped head of adapter fits in the pocket with the cone-shaped inside wall of swivel 79. Air feed and retractor hoses 88 and 89 connected to adapter 86 supply air under pressure to adapter 86.

Drill 67 can be used with jack leg 11 to test for air leakage in jack leg. The procedure for this test is as follows:

1. Put the leg 11 in the test stand adjacent beam 27 and secure as before. Turn on valves 53, 58, 59, and 62. Turn off valves 52, 63, 64, and 65.

2. Hook up the air and water hoses 81 and 73 to the backhead 74 of the drill 69. Turn on the water and the air valves 90 and 91.

3. Repeat all the steps with the corncob on the drill to control air pressure to the feed of the drill.

4. Depress the retract button 78, then check the pressures at the gauges 36 and 37.

5. There should be less than 5 PSI crossover pressures between the feed and retract, in the leg or in the drill.

6. If everything works okay, then test the same as above with operations at full throttle.

7. With all systems on, the leg feed pressure shown by gauge 36 should not drop below 80 PSI.

8. If these conditions are not met, then make only the repairs that are needed to meet the above conditions.

The following test is used if the crossover air pressure is more than 5 PSI.

1. First shut off valves 90 and 91.

2. Only after valves 90 and 91 are closed, remove the "D" handle from the backhead of the drill. Replace it with the drill backhead and body tester.

3. Close valves 54 and 98, open valve 57.

4. Read the pressure for retract on gauge 40 and feed gauge 39.

5. Close valve 57 and observe the gauges 39–41 to see that they do not leak more than 10 PSI in 30 seconds. If they do . . .

6. Disassemble the drill and find and repair the problem, replacing only the faulty parts.

7. Repeat the procedure until the backhead and body and leg will each pass the above pressure tests.

As shown in FIG. 6, water pressure gauge 44 is connected to an on-off valve 92 which is joined to a water line 94 leading to the main water supply line 96. Water is supplied at the rate of 200 GPM at 80 PSI. An on-off air valve 93 is connected to an air line 97 leading to the main air supply line 46. Valves 92 and 93 are connected to a D handle test unit 99.

The testing apparatus includes a "D handle" tester, a New York head tester, drill body tester, and water line tester. These parts are connected to the test bench, as shown in FIG. 6, and subjected to air pressure or water pressure to determine leakage or malfunction. The gauges are used to provide information regarding the location of the defective part.

The backhead 74 test procedure is as follows:

1. The backhead and the New York head testers are used to test the "D" handle.

2. Put the "D" handle in the tester on the bench. Put the New York head and the water needles in at the same time.

3. Turn off valves 92 and 93.

4. Move the corncob on the "D" handle to control the feed pressure. Read on water gauge 42.

5. Push the retract button 78 and read the water pressure on water gauge 43.

6. Turn on the throttle valve 76. This opens the New York head. No water should leak anywhere and the stream coming out of the water needle should be straight.

7. Replace or repair all or any parts as needed to make the water system work correctly.

8. The crossover pressures between corncob control and retract button should be less than 5 PSI with the throttle in any position.

9. If there is a problem, remove the "D" handle and repair as needed.

Figure 8:
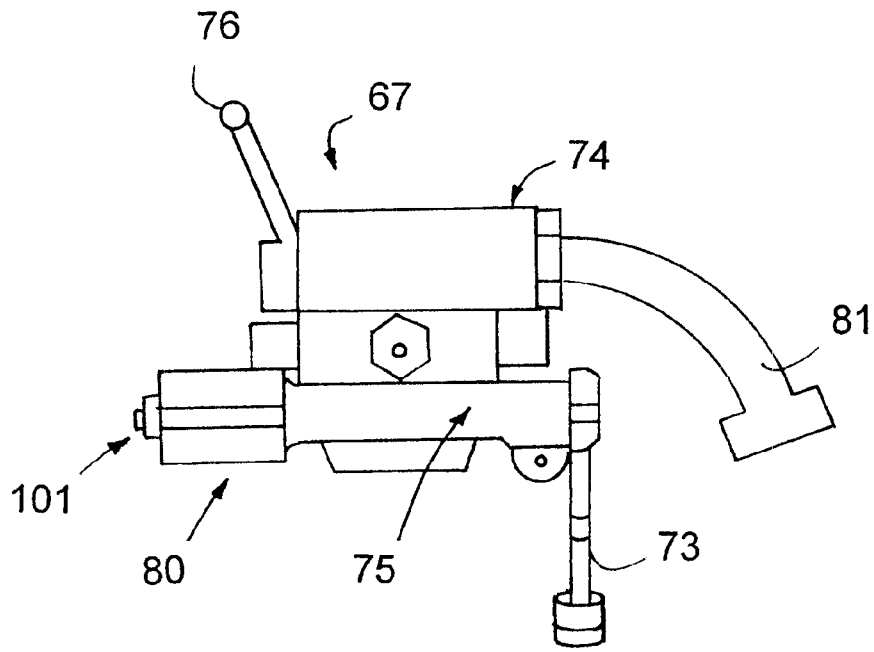
FIG. 8 is a rear elevational view of the air drill.

The jack leg testing system herein described has isolated a number of problems in Secan air drills. As shown in FIG. 8, the inner end of corncob 80 is square and no O-ring seat. A standard nut 101 holds corncob 80 on shaft 102. It was observed that the air drills would be returned to the repair shop because corncob 80 would not turn. Upon disassembly, it was noticed that the factory friction ring was in poor condition due to dirt entering in at the end of the corncob closest to the retract button. Even though the factory makes three different sizes of friction rings, it is hard to find one that would provide the proper tension for the corncob. If it is too loose, it vibrates to the off position when the drill is drilling. If it is too tight, the miners cannot turn it. There were three problems:

1. The corncob gets full of dirt which enters at the corncob joint closest to the retract button.

2. This causes the friction ring to wear out before its time.

3. The drill returns to the shop because the miners cannot turn the corncob to adjust the feed leg pressure.

To solve this problem and improve the time it remains working, to save money on repairs and also to give a way to the miners to be able to adjust the friction of the corncob 80 feed control valve at the location of the work, the following changes were made. These changes are illustrated in FIG. 9.

1. Corncob 80 is removed from shaft 102.

2. The inside end is provided with an internal taper of about 60 degrees.

3. An O-ring 103 is placed around shaft 102 in contact with a shoulder 104 and shaft 102.

4. Corncob 80 is then placed around shaft 102 and retained thereon with a NF nut 106.

The results are as follows:

1. Very little dirt can get into the underside of the corncob 80 due to the "O" ring 103 blocking its passage.

2. The corncob 80 can be adjusted to any tension desired while the drill is being used.

3. As the friction ring 107 wears, the friction against the corncob 80 can be increased or decreased as needed by the operator at the work area at the time it needs to be adjusted.

A second problem of correcting air leakage causing air crossover feed/retract in Secan air drills became apparent after tests with the test system. There are inherent air leakage problems due to the design of the following components: the "D" handle corncob actuating valve, the retract button design, the metal to metal seals in the backhead, the ratchet ring and the valve chest to body design. It became apparent that no matter how good a job you did repairing the leg and the machine, it would still leak air at a rate of 5 to 20 PSI. In fact, a brand new jack leg leaks this amount of air leakage. This leakage in the drill or the leg will cause the entire system (drill and leg) to act in an erratic and unpredictable manner. Examples are:

1. Turning on the leg control and the leg gets full pressure and causes the machine and leg to fly out of your hands.

2. Turning on the leg control, nothing happens until suddenly the leg goes all the way on.

3. Turning on the leg control and the drill begins to rotate slowly.

4. The leg gets stuck at full extension and will not bleed off for two or three minutes after all the air if off.

Figure 10:
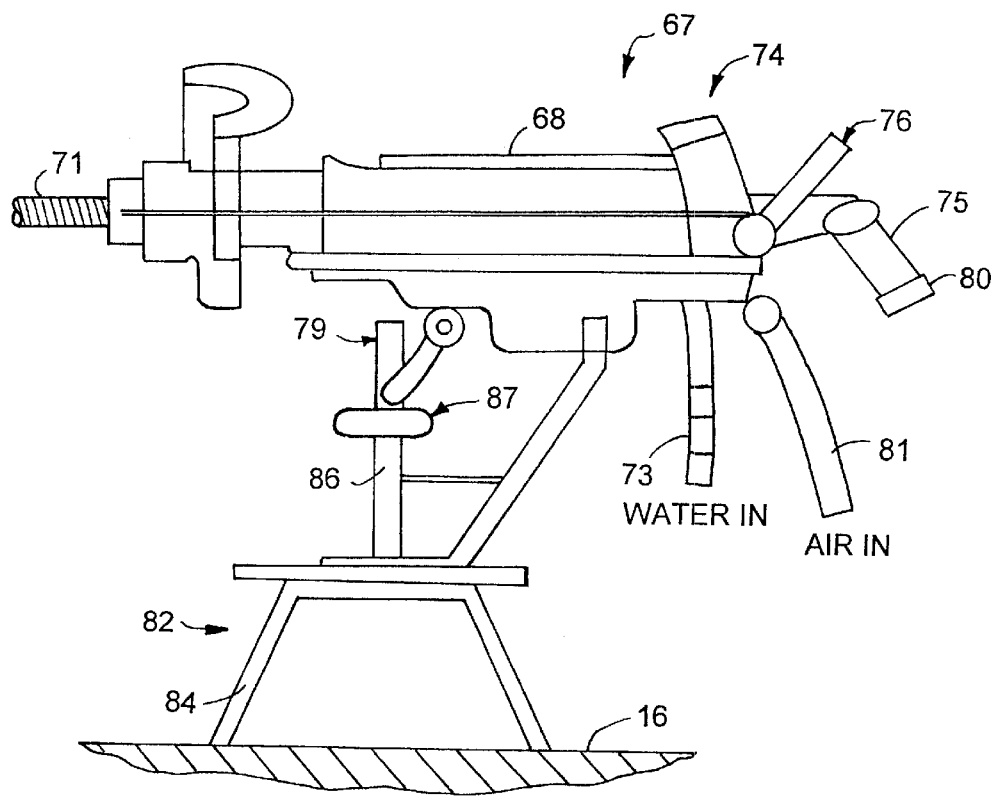
FIG. 10 is a side elevational view of an air drill with a hole in the leg swivel.

These are just a few examples of the innumerable problems that are real and apparent because of the 5 to 20 PSI air leakage in the feed and retract of the machine or leg. As shown in FIG. 10, the solution to this problem was found by drilling a 1/32" hole 80 in the leg swivel 79. This hole is drilled through the weld into the port for the retract. The results are:

1. This causes the crossover feed/retract problem to bleed out at this point, either from the drill or from the leg.

3. The hole is small enough not to effect the performance of the retract feature of the leg and drill.

3. The air drill and jack leg work reliably and consistently because of this simple improvement.

Figure 11:
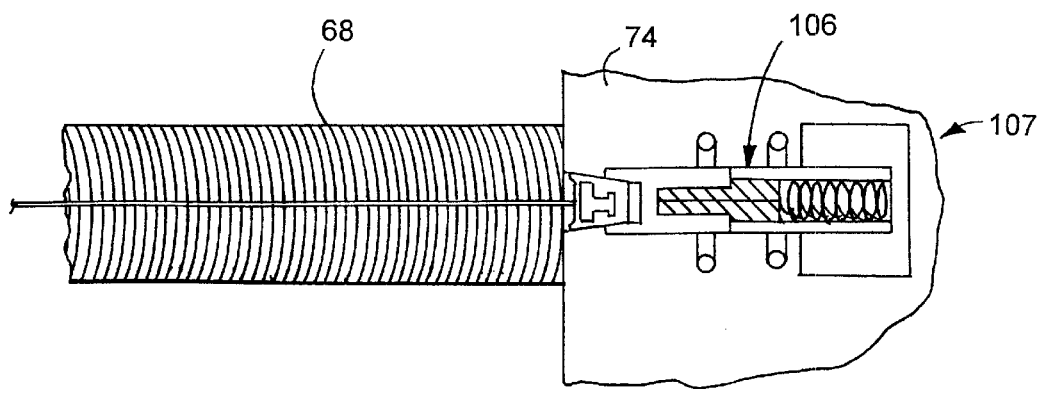
FIG. 11 is a diagrammatic view of the water needle and New York head of the air drill of FIG. 6.

A third problem with air and water in air drills was recognized with the use of the test system. When the water pressure exceeds the air pressure in the air drill, there is water flooding in the air drill and jack leg. The water washes out the oil and causes overheating and failure of the air drill. As shown in FIG. 11, the passage in piston 106 is closed with a weld to prevent water from flowing through piston 106. Piston 106 is part of a wet gland assembly 107 of a New York head. The closure of the passage in piston 106 effectively eliminates water pressure to a level that overcomes the air pressure in the air drill. This New York head modification to eliminate water flooding in air drills and jack legs, washing out the oil and causing failures can be made on conventional air drills.

The number of air and water tests applicable to jack legs and air drills with the test apparatus of the invention is not limited to the lists herein described. A person skilled in the art of jack legs and air drills can perform additional tests and make modifications in the structures, materials and combinations of structures of the test apparatus within the scope of the invention.

What is claimed is:

1. An apparatus for testing a jack leg for air leakage and defective parts, said jack leg having an upright tubular member comprising:

an upright beam, a weight, means mounting the weight on the beam for vertical movement of the weight relative to the beam, an adapter having a tube and a plate, said plate being located below and engageable with said weight, means for connecting the adapter to the tubular member of the jack shaft to allow air to flow from the tube to the tubular member, a first air gauge for indicating air pressure connected to a source of air under pressure, first air line means connecting the first air gauge to the tube of the adapter for allowing air to flow from the first air gauge to the tube of the adapter to expand the jack leg which moves the weight upwardly along the beam when the jack leg is operable and does not move the weight along the beam when the jack leg is defective or leaks air, a first valve connected to the first air line selectively operable to permit air to flow in said first air line and prevent air flow in said first air line, a second air gauge for indicating air pressure, an air bleed valve connected to the second air gauge for allowing air to flow from the second air gauge to atmosphere, a second air line connecting the second air gauge to the tube of the adapter to allow air to flow from the tube and jack leg to the second air gauge whereby the second air gauge indicates the air pressure in the jack leg when the air bleed valve is closed and reduces the air pressure in the jack leg when the bleed valve is open, and second valve means connected to the second air line between the second gauge and tube selectively operable to permit air to flow in said second air line and prevent air to flow in said second air line.

2. The apparatus of claim 1 wherein: said upright beam includes upright side flanges, said means mounting the weight on the beam includes members slidably mounted on the side flanges for vertical movement, and means securing the weight to the members.

3. The apparatus of claim 1 wherein: the plate is a flat horizontal plate, said tube being secured to and extended downwardly from said plate.

4. The apparatus of claim 1 wherein: said adapter includes an internal cone-shaped wall adapted to accommodate a cone-shaped head on the upright tubular member of the jack leg, and means connectable to said adapter for holding the head in engagement with said internal cone-shaped wall.

5. An apparatus for testing a jack leg for air leakage and defective parts, said jack leg having an upright tubular means comprising:

an upright member, a weight, means mounting the weight on the upright member for movement of the weight relative to the upright member, means engageable with the weight for accommodating air under pressure and directing air under pressure to said jack leg, gauge means for indicating air pressure connected to a source of air under pressure, air line means connecting the gauge means to the means engageable with the weight for supplying air under pressure to said means engageable with the weight to expand the jack leg which moves the weight relative to the upright member when the jack leg is operable and does not move the weight when the jack leg is defective or leaks air.

6. The apparatus of claim 5 including: valve means connected to the air line means selectively operable to permit flow of air to the means engageable with the weight and prevent the flow of air to the means engageable with the weight.

7. The apparatus of claim 5 wherein: the means engageable with the weight includes an adapter connectable with the upright tubular member of the jack leg, said adapter allowing air to flow into the jack leg.

8. The apparatus of claim 7 wherein: said adapter includes an internal cone-shaped wall adapted to accommodate a cone-shaped head on the upright tubular member of the jack leg, and means connectable to said adapter for holding the head in engagement with said internal cone-shaped wall.

9. The apparatus of claim 5 wherein: said means engageable with said weight includes a plate located in engagement with said weight.

10. The apparatus of claim 5 wherein: said gauge means includes a first air gauge and a second air gauge for indicating different air pressures within the jack leg.

11. An apparatus for testing an air driven drill for air and water leakage and defective parts, said drill having a water inlet and an air inlet to allow water and air to flow into the drill, comprising:

a test stand having a panel, air pressure gauge mounted on the panel adapted to be connected to a source of air pressure and the air inlet of the drill for indicating the air pressure supplied to the drill, an on-off valve connected to the air pressure gauge for controlling the flow of air to the air pressure gauge, an air feed gauge mounted on the panel connected to the air inlet of the drill to indicate the feed air pressure in the drill, an air retract gauge mounted on the panel connected to the air inlet of the drill, to indicate the retract air pressure in the drill, a water pressure gauge mounted on the panel adapted to be connected to a source of water under pressure and the water inlet of the drill for indicating the water pressure supplied to the drill, an on-off valve connected to the water pressure gauge for controlling the flow of water to the water pressure gauge, a water feed gauge mounted on the panel connected to the water inlet of the drill to indicate the feed water pressure in the drill, and a water retract gauge mounted on the panel connected to the water inlet to indicate the retract water pressure in the drill.

12. The apparatus of claim 11 including: an air bleed valve connected to the air pressure gauge operable to vent air from the air bleed valve and drill.

13. The apparatus of claim 11 including: a drill test stand, an adapter and swivel for supporting the drill on the drill test stand, and an air vent hole in the swivel for venting air supplied to the air retract gauge.

14. The apparatus of claim 13 wherein: the drill test stand includes a generally horizontal table, said adapter being secured to the table.

15. The apparatus of claim 11 including: a drill test stand, first means mounted on the drill test stand, and second means connected to the first means for mounting the drill on the drill test stand.

16. An apparatus for testing an air driven drill for air and water leakage and defective parts, said drill having a water inlet and an air inlet to allow water and air to flow into the drill, comprising:

an air pressure gauge adapted to be connected to a source of air pressure and the air inlet of the drill for indicating the air pressure supplied to the drill, an on-off valve connected to the air pressure gauge for controlling the flow of air to the air pressure gauge, an air feed gauge connected to the air inlet of the drill to indicate the feed air pressure in the drill, an air retract gauge connected to the air inlet of the drill to indicate the retract air pressure in the drill, a water pressure gauge adapted to be connected to a source of water under pressure and the water inlet of the drill for indicating the water pressure supplied to the drill, an on-off valve connected to the water pressure gauge for controlling the flow of water to the water pressure gauge, a water feed gauge connected to the water inlet of the drill to indicate the feed water pressure in the drill, and a water retract gauge connected to the water inlet to indicate the retract water pressure in the drill.

17. The apparatus of claim 15 including: an air bleed valve connected to the air pressure gauge operable to vent air from the air bleed valve and drill.

18. The apparatus of claim 15 including: a drill test stand, an adapter and swivel for supporting the drill on the drill test stand, and an air vent hole in the swivel for venting air supplied to the air retract gauge.

19. The apparatus of claim 18 wherein: the drill test stand includes a generally horizontal table, said adapter being secured to the table.

20. The apparatus of claim 15 including: a drill test stand, first means mounted on the drill test stand, and second means connected to the first mean for mounting the drill on the drill test stand.

* * * * *